(12) United States Patent
Dirnfeldner

(10) Patent No.: US 7,444,201 B2
(45) Date of Patent: *Oct. 28, 2008

(54) MACHINE TOOL OR PRODUCTION MACHINE WITH A DISPLAY UNIT FOR VISUALLY DISPLAYING OPERATING SEQUENCES

(75) Inventor: Rainer Dirnfeldner, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 332 days.

This patent is subject to a terminal disclaimer.

(21) Appl. No.: 10/558,896

(22) PCT Filed: Jun. 7, 2004

(86) PCT No.: PCT/EP2004/006138

§ 371 (c)(1),
(2), (4) Date: Nov. 30, 2005

(87) PCT Pub. No.: WO2004/108348

PCT Pub. Date: Dec. 16, 2004

(65) Prior Publication Data

US 2007/0027561 A1 Feb. 1, 2007

(30) Foreign Application Priority Data

Jun. 6, 2003 (DE) .............................. 103 25 894

(51) Int. Cl.
*G06F 19/00* (2006.01)
*G06F 3/048* (2006.01)
*G06F 3/041* (2006.01)
*G06F 1/16* (2006.01)
*G05B 19/18* (2006.01)
*G09G 5/00* (2006.01)
*G03B 21/26* (2006.01)
*G03B 21/22* (2006.01)
*G03B 21/14* (2006.01)
*G02B 27/14* (2006.01)
*H05F 7/00* (2006.01)
*G03H 1/00* (2006.01)

(52) U.S. Cl. .................. 700/180; 700/59; 700/160; 715/764; 345/7; 345/173; 353/28; 353/71; 353/119; 361/681; 359/13; 359/630

(58) Field of Classification Search .............. 700/59, 700/159, 160, 180; 715/764; 345/87, 104, 345/156, 157, 173, 419, 7; 348/136, 115; 353/28–30, 34, 43, 70–72, 119; 359/13, 359/639; 361/681; 399/81; 434/44, 180; 463/30, 31, 34; 358/1.6

See application file for complete search history.

(56) References Cited

U.S. PATENT DOCUMENTS

RE32,253 E * 9/1986 Bartulis et al. ............... 399/81

(Continued)

FOREIGN PATENT DOCUMENTS

DE 40 29 312 A 3/1992

(Continued)

*Primary Examiner*—Crystal Barnes Bullock
(74) *Attorney, Agent, or Firm*—Henry M. Feiereisen; Ursula B. Day

(57) ABSTRACT

The invention relates to a machine tool or production machine in which the tool/machine has a display unit (4, 5) for visually displaying operating sequences and/or parameters of the tool/machine, whereby the display unit (4, 5) is provided in the form of a projection display (4). Compared to prior art display units or control panels, the inventive display unit provides a user of a machine tool or production machine with an improved ability to view and input information.

3 Claims, 1 Drawing Sheet

U.S. PATENT DOCUMENTS

| | | | |
|---|---|---|---|
| 5,400,095 A * | 3/1995 | Minich et al. | 353/119 |
| 5,511,148 A * | 4/1996 | Wellner | 358/1.6 |
| 5,515,079 A * | 5/1996 | Hauck | 345/157 |
| 6,456,438 B1 | 9/2002 | Lee et al. | |
| 6,977,643 B2 * | 12/2005 | Wilbrink et al. | 345/156 |
| 7,121,670 B2 * | 10/2006 | Salvatori et al. | 353/119 |
| 2001/0046034 A1 * | 11/2001 | Gold et al. | 353/72 |
| 2002/0005915 A1 | 1/2002 | Rodriguez, Jr. | |
| 2002/0015037 A1 * | 2/2002 | Moore et al. | 345/419 |
| 2003/0165048 A1 * | 9/2003 | Bamji et al. | 361/681 |
| 2003/0231261 A1 | 12/2003 | Bassi et al. | |

FOREIGN PATENT DOCUMENTS

| | | |
|---|---|---|
| DE | 197 08 240 A1 | 9/1998 |
| DE | 101 44 075 A1 | 4/2003 |
| EP | 0 413 954 A | 2/1991 |
| JP | 04006583 A * | 1/1992 |
| JP | 06 067804 A | 3/1994 |
| JP | 11042366 A * | 2/1999 |
| JP | 11 156677 A | 6/1999 |
| JP | 2004233533 A * | 8/2004 |
| WO | WO 00/52541 | 9/2000 |

* cited by examiner

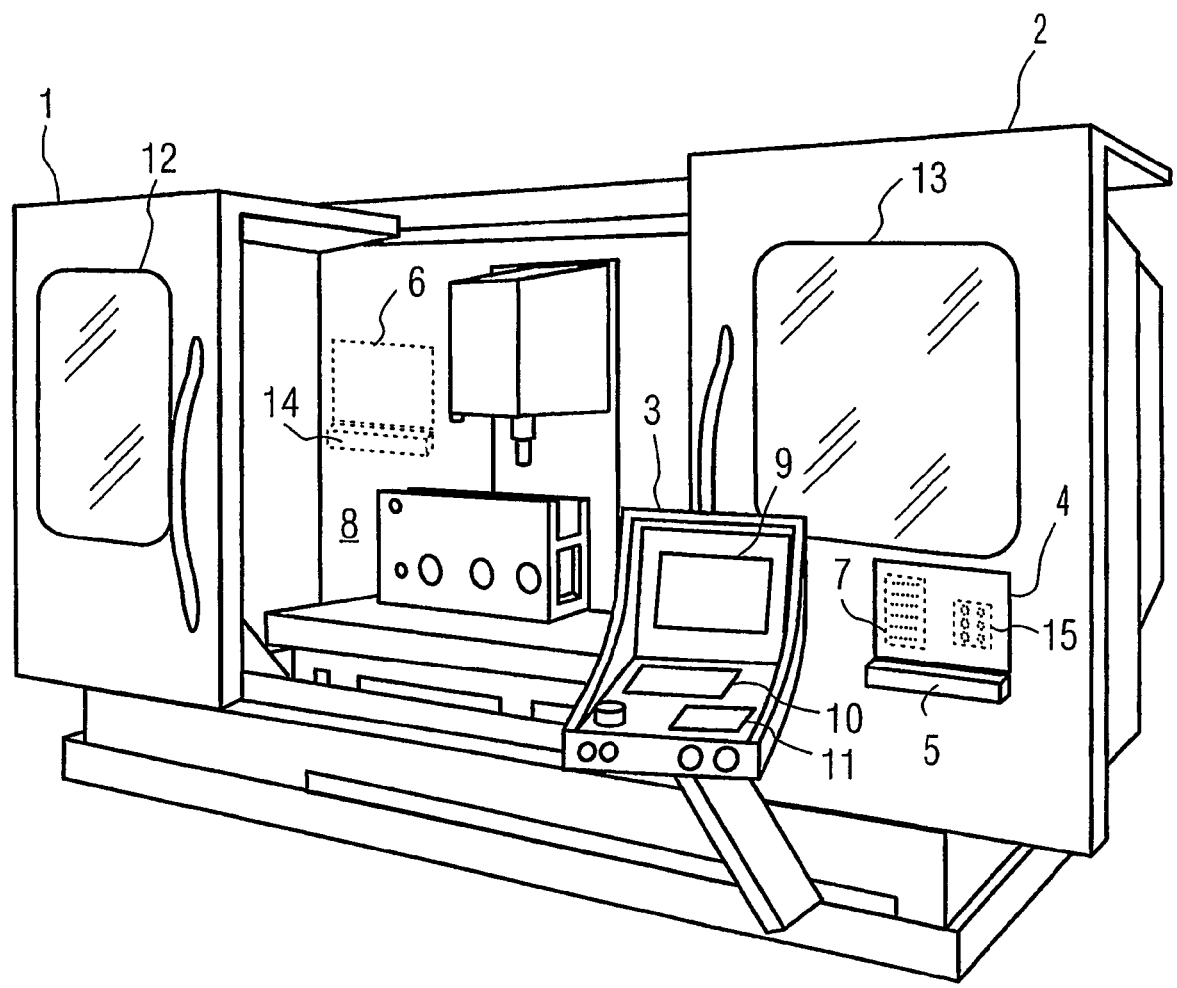

MACHINE TOOL OR PRODUCTION MACHINE WITH A DISPLAY UNIT FOR VISUALLY DISPLAYING OPERATING SEQUENCES

BACKGROUND OF THE INVENTION

The invention relates to a machine tool or production machine, the tool/machine having a display unit for visually displaying operating sequences and/or parameters of the tool/machine.

Almost every commercially available machine tool or production machine nowadays has a display unit or a control panel with the aid of which the production process can be parameterized, controlled and monitored in situ. Usually a CRT or LCD screen is used as the display unit. This is usually located next to or in front of the tool/machine as an integral part of a control panel or is mounted on a movable boom, as it is known.

SUMMARY OF THE INVENTION

The invention is based on the object of using a projection display to provide an improved visual display capability for a user of a machine tool or production machine in comparison with conventional display units or control panels.

This object is achieved for a machine tool or production machine of the type mentioned at the beginning by a projection display being provided as the display unit.

The invention is based on the idea that a projection display is used as the display unit. In this case, the projection display may be used in addition to the existing, commercially available conventional display unit or control panel or as alternative in place of the conventional display unit or control panel.

In the case of a projection display, the image to be presented is projected by a projection unit onto an opaque surface. This may be, for example, any flat panel, which may consist for example of high-grade steel or plastic. As a result, information can be offered at a place where the operator can receive and assign it most easily, for example directly on the tool/machine housing and/or in the working space of the tool/machine.

The panel onto which the image is projected by the projection unit is in this case completely insensitive to environmental influences, such as for example temperature and contamination, so that a display can take place even at locations at which it would not be possible with the conventionally used technology. In the case of the projection technique, the size of the display is restricted essentially only by the available projection area, i.e. the size of the panel. This provides great flexibility with respect to the size of the display and the amount of information presented simultaneously. Scaling according to the requirements of the tool/machine or the wishes of the customer is also possible without any problem.

A first advantageous form of the invention is characterized in that a flat panel onto which an image is projected by means of a projection unit is provided as the projection display. Such a flat panel can be produced at low cost.

In this connection, it proves to be advantageous if the panel can be provided on the tool/machine housing and/or in the working space of the tool/machine. The panel can be provided at particularly low cost on the tool/machine housing, which is present in any case. If the panel is provided in the working space of the tool/machine, it is made possible for the user to view the production process and the information projected onto the panel by the projection unit simultaneously.

Furthermore, it proves to be advantageous if the panel is an integral part of the tool/machine housing. If the panel is an integral part of the tool/machine housing, particularly low-cost realization of the projection display is possible.

Furthermore, it proves to be advantageous if the display unit has virtual optically presented input means and operator actions can be captured by means of the input means, and in such a way the tool/machine can be controlled by an operator. If it is possible by means of the projection display not only to present information but also to pass on operator actions, such as parameterization and control commands for example, from the operator to the control system of the tool/machine, a conventional display unit or control panel can be completely replaced by the projection display.

In this connection, it proves to be advantageous if the operator actions of the input means can be captured by means of a camera or by means of a touch-sensitive panel. Such capturing by means of a camera or by means of a touch-sensitive panel is particularly reliable.

BRIEF DESCRIPTION OF THE DRAWING

An exemplary embodiment of the invention is explained in more detail below and represented in the drawing, in which:

FIG. 1 shows a machine tool according to the invention.

DETAILED DESCRIPTION OF THE PREFERRED EMBODIMENTS

In FIG. 1, a machine tool according to the invention is represented in the form of an exemplary embodiment. The machine tool has a working space 8, in which the production process takes place and which can be separated from the working area of the operator of the tool/machine by means of two sliding doors 1 and 2. In FIG. 1, the two sliding doors 1 and 2 are represented in the open state.

Furthermore, the tool/machine has a conventional display unit or control panel 3. This has, for display purposes, an LCD screen 9 and, as input means, inter alia, two keyboard zones 10 and 11. With the aid of the control panel 3, the tool/machine can be operated, in particular parameterized and controlled, by an operator in situ. Furthermore, the sliding door 1 is provided with a glass plate 12 and the sliding door 2 with a glass plate 13, which make it possible for the operator to see into the working space 8 to monitor the situation.

Fastened on the outer side of the sliding door 2 are a flat panel 4 and a projection unit 5. The panel 4 and the projection unit 5 together form a so-called projection display. For this purpose, the projection unit 5 projects onto the panel 4 an image that can be visually perceived by the operator.

In the exemplary embodiment, a display zone 7 for the visual display of operating sequences and/or parameters of the tool/machine but also a so-called virtual keyboard zone 15 as input means are projected with the aid of the projection unit 5 onto the panel 4. It should be noted at this point that other input means, such as for example a virtual mouse, are of course also conceivable as input means.

The operator actions carried out by the operator by means of the virtual keyboard zone 15 are thereby captured optically by a camera integrated in the projection unit 5 and made available to the control system of the tool/machine. The virtual keyboard 8 consequently operates as a virtual touch-screen. The capturing of the input may of course also take place alternatively by means of a touch-sensitive panel.

In the exemplary embodiment, the tool/machine consequently has, apart from the control panel 3, an additional operator control and display possibility in the form of the projection display. Since, in the exemplary embodiment, the display unit according to the invention consequently not only has a display functionality but also an operator control functionality, it is consequently also possible to dispense completely with the conventional, commercially available control panel 3.

If the sliding doors 1 and 2 are closed, the direct arrangement of the projection display on the sliding door 2 directly underneath the window 13 makes it possible for the user to see the information presented on the projection display and the processes taking place in the working space 8 together simultaneously during the production process. In the case for example of malfunctions occurring, the operator can pass on appropriate commands to the control system of the tool/machine directly via the virtual keyboard zone 8. Alternatively, however, the panel 4 could also be mounted directly, for example in a corner of the viewing window 13.

It is of course also conceivable to provide in addition or as alternative to the display unit provided on the sliding door 2, a further display unit, which comprises a panel 6 depicted by dashed lines and a projection unit 14 depicted by dashed lines, in the working space 8 of the tool/machine. This makes it possible for the operator to have a parallel display of the production process captured in the working space 8 and the information concerning the production process presented on the panel 6 when the sliding doors 1 and 2 are open or when the sliding doors are closed by means of the viewing windows 12 and 13. However, it is also conceivable in this connection, inter alia, to use the projection unit 14 for example for marking defective machine or tool components.

The use of a projection display as a display unit with a possibly integrated operator control capability in the case of machine tools or production machines is particularly well suited for innovative applications in commissioning, production, diagnostic and service procedures. These are often concerned with bringing information into relation with sequences in the working space of the tool/machine as well as possible. By integrating a projection display into existing tool/machine components, the operator control and display of the control system are virtually fused together with the tool/machine. The saving of space and the reduction of components bring about a considerable reduction in costs as compared with the use of display units or control panels realized by conventional setting-up technology.

The possibility of making information available to the operator with the aid of a projection display located in the working space or the vicinity of the working space allows fundamental innovation in the area of commissioning, production, service and diagnostics. For example, suggestions concerning faults which occur during the production process can be visually displayed in the direct vicinity of where they occur. Furthermore, operating instructions can be displayed step by step directly on the tool/machine, so that they can be followed much more easily by the operator than would be the case with a conventional display unit or control panel.

Furthermore, the projection display is distinguished by its particularly great robustness with respect to environmental influences, so that it can be provided at virtually any locations in, around or on the machine. If, apart from information, an input means, for example a keyboard zone, is projected and operator actions are optically captured, for example by a camera, which may be integrated for example in the projection unit, or by means of a panel with touch-sensitive characteristics (virtual touchscreen), it may be possible to dispense entirely with the previous display unit or operator control unit.

In principle, the display unit according to the invention can thus be used in addition or as an alternative to the existing commercially available display unit or control panel.

At this point it should be noted that single-axis or multi-axis turning, milling, drilling or grinding machines are to be understood for example as machine tools. The machine tools also include machining centers, linear and rotary transfer machines, laser machines or hobbing and gear-cutting machines. Common to all of these is that a material is worked, it being possible for this working to be performed in more than one axis. The production machines include, for example, textile, plastic, wood, glass, ceramic or stone working machines. Machines of forming technology, packaging technology, printing technology, conveying technology, pumping technology, ventilation technology, lifting tools and robots are likewise classified as production machines.

What is claimed is:

1. A machine tool or production machine, comprising;
   a machine housing having a working space,
   a display unit for visually displaying an operating sequence and/or parameter, said display unit being constructed as a projection display which includes a projection unit for projecting an image onto an opaque surface, said opaque surface forming a part of a flat panel onto which the image is projected by the projection unit, said flat panel and said projection unit being disposed in the working space.

2. The machine tool or production machine of claim 1, wherein the display unit has virtual optically presented input means for capturing an operating action to thereby allow control of the machine tool or production machine by an operator, further comprising a camera for capturing the operating action of the input means.

3. The machine tool or production machine of claim 1, wherein the display unit projects a marking onto a machine or tool component.

* * * * *